US009284647B2

(12) United States Patent
Ochiai et al.

(10) Patent No.: US 9,284,647 B2
(45) Date of Patent: Mar. 15, 2016

(54) METHOD FOR COATING SLIDING SURFACE OF HIGH-TEMPERATURE MEMBER, HIGH-TEMPERATURE MEMBER AND ELECTRODE FOR ELECTRO-DISCHARGE SURFACE TREATMENT

(75) Inventors: Hiroyuki Ochiai, Tokyo (JP); Mitsutoshi Watanabe, Tokyo (JP); Mikiya Arai, Tokyo (JP); Shigeru Saburi, Tokyo (JP); Eiji Nakayama, Tokyo (JP); Akihiro Goto, Tokyo (JP); Masao Akiyoshi, Tokyo (JP)

(73) Assignees: MITSUBISHI DENKI KABUSHIKI KAISHA, Tokyo (JP); IHI CORPORATION, Tokyo (JP)

( * ) Notice: Subject to any disclaimer, the term of this patent is extended or adjusted under 35 U.S.C. 154(b) by 806 days.

(21) Appl. No.: 12/558,950

(22) Filed: Sep. 14, 2009

(65) Prior Publication Data

US 2010/0086398 A1 Apr. 8, 2010

Related U.S. Application Data

(63) Continuation-in-part of application No. 10/976,234, filed on Oct. 29, 2004, which is a continuation-in-part of application No. PCT/JP03/12088, filed on Sep. 22, 2003.

(30) Foreign Application Priority Data

Sep. 24, 2002 (JP) .................. 2002/276860
Oct. 9, 2002 (JP) .................. 2002/295963

(51) Int. Cl.
| B32B 15/04 | (2006.01) |
| F01D 5/28 | (2006.01) |
| C23C 26/00 | (2006.01) |
| C23C 4/06 | (2006.01) |
| C22C 19/07 | (2006.01) |
| C23C 30/00 | (2006.01) |

(52) U.S. Cl.
CPC .............. *C23C 26/00* (2013.01); *B32B 15/04* (2013.01); *C22C 19/07* (2013.01); *C23C 4/06* (2013.01); *C23C 30/00* (2013.01); *F01D 5/288* (2013.01); *F05D 2300/509* (2013.01); *Y02T 50/67* (2013.01); *Y10T 428/12937* (2015.01)

(58) Field of Classification Search
USPC .............. 428/689, 698, 699, 701, 702, 304.4, 428/312.2, 312.6, 307.3, 469; 427/580; 148/220; 508/103, 107, 108; 416/241 B, 241 R; 420/436
See application file for complete search history.

(56) References Cited

U.S. PATENT DOCUMENTS

| 2,964,420 | A | | 12/1960 | Poorman et al. |
| 3,197,861 | A | * | 8/1965 | Brick ............................. 205/138 |
| 3,350,178 | A | * | 10/1967 | Miller ............................ 428/566 |
| 3,444,058 | A | | 5/1969 | Senderoff et al. |
| 3,444,059 | A | | 5/1969 | Throop |
| 3,552,479 | A | | 1/1971 | Hockin |
| 3,660,882 | A | | 5/1972 | Widowitz et al. |
| 3,754,899 | A | | 8/1973 | Kanter |
| 3,778,586 | A | | 12/1973 | Breton et al. |
| 3,853,602 | A | * | 12/1974 | Nakamura .................... 428/682 |
| 3,890,456 | A | * | 6/1975 | Dils .............................. 428/216 |
| 3,961,910 | A | | 6/1976 | Baladjanian et al. |
| 4,049,428 | A | | 9/1977 | Elbert et al. |
| 4,124,737 | A | * | 11/1978 | Wolfla et al. .................. 428/679 |
| 4,193,852 | A | | 3/1980 | Inoue |
| 4,414,249 | A | | 11/1983 | Ulion et al. |
| 4,520,087 | A | | 5/1985 | Kamata et al. |
| 4,735,656 | A | | 4/1988 | Schaefer et al. |
| 4,735,678 | A | | 4/1988 | Mandigo et al. |
| 4,744,725 | A | | 5/1988 | Matarese et al. |
| 4,797,527 | A | | 1/1989 | Yamamoto et al. |

(Continued)

FOREIGN PATENT DOCUMENTS

| EP | 0 705 911 A1 | 4/1996 |
| EP | 1 231 299 A1 | 8/2002 |

(Continued)

OTHER PUBLICATIONS

N.G. Baranov. "Antifriction Powder Materials for High-Speed Rubbing Pairs." Plenum Publishing Corporation. 1989. pp. 703-710. Translated from Poroshkovaya Metallurgiya, No. 9(309), pp. 29-38, Sep. 1988. Original article submitted Sep. 25, 1987.*

(Continued)

*Primary Examiner* — David Sample
*Assistant Examiner* — Nicholas W Jordan
(74) *Attorney, Agent, or Firm* — Griffin and Szipl PC

(57) ABSTRACT

A sliding surface of a high-temperature portion is subjected to an electro-discharge surface treatment with one or both of a high-temperature hard material (4) and a material having a lubricating property at a high temperature (6). The high-temperature hard material (4) is any or a mixture of cBN, TiC, TiN, TiAlN, $TiB_2$, WC, $Cr_3C_2$, SiC, ZrC, VC, $B_4C$, $Si_3N_4$, $ZrO_2$, and $Al_2O_3$. The material having the lubricating property at the high temperature (6) contains chromium and/or chromium oxide ($Cr_2O_3$) and/or hexaboron nitride (hBN). An electrode formed by compression molding of the high-temperature hard material, and the high-temperature lubricating material containing at least one of Cr and hBN and having the lubricating property at the high temperature is used as the electrode for the electro-discharge surface treatment.

7 Claims, 12 Drawing Sheets

(56) References Cited

U.S. PATENT DOCUMENTS

| | | | |
|---|---|---|---|
| 4,802,828 A | 2/1989 | Rutz et al. | |
| 4,818,388 A | 4/1989 | Morioka et al. | |
| 4,828,934 A | 5/1989 | Pinkhasov | |
| 4,851,188 A | 7/1989 | Schaefer et al. | |
| 4,878,953 A | 11/1989 | Saltzman et al. | |
| 4,884,820 A | 12/1989 | Jackson et al. | |
| 5,024,884 A | 6/1991 | Otfinoski | |
| 5,074,970 A | 12/1991 | Routsis et al. | |
| 5,108,555 A | 4/1992 | Nishimuro et al. | |
| 5,134,032 A | 7/1992 | Cooper et al. | |
| 5,231,270 A | 7/1993 | Groos et al. | |
| 5,264,011 A | 11/1993 | Brown et al. | |
| 5,304,288 A | 4/1994 | De Beurs et al. | |
| 5,314,304 A | 5/1994 | Wiebe | |
| 5,476,363 A | 12/1995 | Freling et al. | |
| 5,485,890 A | 1/1996 | Cawthorne et al. | |
| 5,603,603 A | 2/1997 | Benoit et al. | |
| 5,637,239 A | 6/1997 | Adamski et al. | |
| 5,804,789 A | 9/1998 | Saito et al. | |
| 5,837,957 A | 11/1998 | Sato et al. | |
| 5,851,678 A | 12/1998 | Hasz et al. | |
| 5,858,479 A | 1/1999 | Saito et al. | |
| 5,866,518 A | 2/1999 | Dellacorte et al. | |
| 5,906,896 A | 5/1999 | Jackson et al. | |
| 5,935,407 A | 8/1999 | Nenov et al. | |
| 5,952,110 A | 9/1999 | Schell et al. | |
| 5,964,091 A * | 10/1999 | Fukui et al. | 60/752 |
| 5,972,424 A | 10/1999 | Draghi et al. | |
| 6,042,778 A * | 3/2000 | Kraft et al. | 419/27 |
| 6,086,684 A | 7/2000 | Saito et al. | |
| 6,190,124 B1 | 2/2001 | Freling et al. | |
| 6,194,086 B1 | 2/2001 | Nenov et al. | |
| 6,221,181 B1 * | 4/2001 | Bossmann et al. | 428/680 |
| 6,254,660 B1 * | 7/2001 | Bernard et al. | 75/252 |
| 6,274,201 B1 * | 8/2001 | Borom et al. | 427/454 |
| 6,311,576 B1 | 11/2001 | Pletschet | |
| 6,314,778 B1 | 11/2001 | Moro et al. | |
| 6,348,668 B1 | 2/2002 | Moro et al. | |
| 6,358,002 B1 | 3/2002 | Good et al. | |
| 6,365,008 B1 | 4/2002 | Goto et al. | |
| 6,434,823 B1 | 8/2002 | Gupta et al. | |
| 6,437,278 B1 | 8/2002 | Inoue et al. | |
| 6,492,611 B2 | 12/2002 | Goto et al. | |
| 6,532,656 B1 | 3/2003 | Wilkins et al. | |
| 6,548,028 B1 | 4/2003 | Yuzawa et al. | |
| 6,548,188 B1 * | 4/2003 | Yanase et al. | 428/626 |
| 6,588,103 B2 | 7/2003 | Fernihough et al. | |
| 6,602,561 B1 | 8/2003 | Goto et al. | |
| 6,676,741 B2 | 1/2004 | Phillips et al. | |
| 6,689,424 B1 * | 2/2004 | Wang et al. | 427/456 |
| 6,764,771 B1 * | 7/2004 | Heimberg et al. | 428/472 |
| 6,783,795 B2 | 8/2004 | Inoue et al. | |
| 6,793,982 B1 | 9/2004 | Yamada et al. | |
| 6,808,604 B1 | 10/2004 | Goto et al. | |
| 6,811,379 B2 | 11/2004 | Fernihough et al. | |
| 6,821,579 B2 | 11/2004 | Yuzawa et al. | |
| 6,929,829 B2 | 8/2005 | Mohri et al. | |
| 6,935,917 B1 | 8/2005 | Goto et al. | |
| 7,063,250 B2 | 6/2006 | Ohara et al. | |
| 7,509,736 B2 | 3/2009 | Boudereau et al. | |
| 7,537,808 B2 | 5/2009 | Goto et al. | |
| 7,537,809 B2 | 5/2009 | Ochiai et al. | |
| 7,691,454 B2 | 4/2010 | Goto et al. | |
| 7,723,636 B2 | 5/2010 | Ochiai et al. | |
| 7,763,349 B2 | 7/2010 | Ochiai et al. | |
| 7,776,409 B2 | 8/2010 | Goto et al. | |
| 7,824,159 B2 | 11/2010 | Ochiai et al. | |
| 7,834,291 B2 | 11/2010 | Goto et al. | |
| 7,910,176 B2 | 3/2011 | Goto et al. | |
| 7,915,559 B2 | 3/2011 | Goto et al. | |
| 7,918,460 B2 | 4/2011 | Ochiai et al. | |
| 8,162,601 B2 * | 4/2012 | Ochiai et al. | 415/200 |
| 8,287,968 B2 | 10/2012 | Goto et al. | |
| 8,309,233 B2 | 11/2012 | Facchini et al. | |
| 2001/0014405 A1 | 8/2001 | Yuzawa et al. | |
| 2002/0017235 A1 * | 2/2002 | Nagasaka et al. | 117/106 |
| 2002/0136613 A1 | 9/2002 | Tidwell | |
| 2002/0147521 A1 | 10/2002 | Mok et al. | |
| 2003/0155045 A1 * | 8/2003 | Williams | 148/319 |
| 2003/0183529 A1 | 10/2003 | Ohara et al. | |
| 2004/0022949 A1 | 2/2004 | Hasezaki et al. | |
| 2004/0064945 A1 | 4/2004 | Howley | |
| 2004/0067317 A1 | 4/2004 | Gorman | |
| 2004/0091627 A1 | 5/2004 | Ohara et al. | |
| 2004/0096318 A1 | 5/2004 | Ohara et al. | |
| 2005/0003172 A1 | 1/2005 | Wheeler et al. | |
| 2005/0063827 A1 | 3/2005 | Ochiai et al. | |
| 2005/0129511 A1 | 6/2005 | Allen | |
| 2005/0211165 A1 | 9/2005 | Goto et al. | |
| 2006/0021868 A1 | 2/2006 | Goto et al. | |
| 2006/0035068 A1 | 2/2006 | Ochiai et al. | |
| 2006/0078738 A1 | 4/2006 | Goto et al. | |
| 2006/0081462 A1 | 4/2006 | Goto et al. | |
| 2006/0086617 A1 | 4/2006 | Goto et al. | |
| 2006/0086695 A1 | 4/2006 | Goto et al. | |
| 2006/0090997 A1 | 5/2006 | Goto et al. | |
| 2006/0118402 A1 | 6/2006 | Goto et al. | |
| 2006/0213777 A1 | 9/2006 | Goto et al. | |
| 2006/0240184 A1 | 10/2006 | Oshiai et al. | |
| 2006/0280597 A1 | 12/2006 | Ochiai et al. | |
| 2007/0068793 A1 | 3/2007 | Goto et al. | |
| 2007/0104585 A1 | 5/2007 | Ochiai et al. | |
| 2007/0160469 A1 | 7/2007 | Ochiai et al. | |
| 2007/0184298 A1 | 8/2007 | Ochiai et al. | |
| 2008/0066646 A1 | 3/2008 | Ochiai et al. | |
| 2008/0230374 A1 | 9/2008 | Goto et al. | |
| 2008/0304975 A1 | 12/2008 | Clark et al. | |
| 2009/0214352 A1 | 8/2009 | Ochiai et al. | |
| 2009/0288809 A1 | 11/2009 | Shigyo et al. | |
| 2010/0086398 A1 | 4/2010 | Ochiai et al. | |
| 2010/0119864 A1 | 5/2010 | Ochiai et al. | |
| 2010/0126871 A1 | 5/2010 | Shiino et al. | |
| 2010/0180725 A1 | 7/2010 | Goto et al. | |
| 2010/0200548 A1 | 8/2010 | Shiino et al. | |
| 2010/0239841 A1 | 9/2010 | Ochiai et al. | |
| 2010/0330302 A1 | 12/2010 | Watanabe et al. | |
| 2011/0027099 A1 | 2/2011 | Ochiai et al. | |
| 2011/0135845 A1 | 6/2011 | Goto et al. | |
| 2011/0300311 A1 | 12/2011 | Watanabe et al. | |
| 2015/0104585 A1 | 4/2015 | Tabata et al. | |

FOREIGN PATENT DOCUMENTS

| | | |
|---|---|---|
| GB | 2069396 A | 8/1981 |
| JP | 51-97099 A | 8/1976 |
| JP | 54-104095 | 8/1979 |
| JP | 55-48538 A | 4/1980 |
| JP | 56-15938 A | 2/1981 |
| JP | 61-246301 A | 11/1986 |
| JP | 63-005956 A | 1/1987 |
| JP | 03-066520 | 3/1991 |
| JP | 04033810 A | 2/1992 |
| JP | 6-106420 | 9/1992 |
| JP | 04261714 A | 9/1992 |
| JP | 05-148615 | 6/1993 |
| JP | 5-148615 A | 6/1993 |
| JP | 5-285737 A | 11/1993 |
| JP | 5-287335 A | 11/1993 |
| JP | 5-508684 | 12/1993 |
| JP | 6-182626 | 7/1994 |
| JP | 07-197275 | 8/1995 |
| JP | 07-301103 | 11/1995 |
| JP | 08-053777 | 2/1996 |
| JP | 08-081756 | 3/1996 |
| JP | 8-300227 A | 11/1996 |
| JP | 08-319804 | 12/1996 |
| JP | 8-327263 A | 12/1996 |
| JP | 9-19829 A | 1/1997 |
| JP | 09-192937 | 7/1997 |
| JP | 11000827 | 6/1999 |
| JP | 11-286768 | 10/1999 |
| JP | 11-320272 A | 11/1999 |
| JP | 2000-345367 | 12/2000 |
| JP | 2000-345809 | 12/2000 |

(56) References Cited

FOREIGN PATENT DOCUMENTS

| | | |
|---|---|---|
| JP | 2001-152803 | 6/2001 |
| JP | 3227454 | 8/2001 |
| JP | 2001-279465 | 10/2001 |
| JP | 2005-8942 | 1/2005 |
| JP | 2005-2882 | 6/2005 |
| JP | 2005-155711 A | 6/2005 |
| WO | 91/14799 | 10/1991 |
| WO | 99/58744 | 11/1999 |
| WO | 99/64641 A1 | 12/1999 |
| WO | 00/29154 | 5/2000 |
| WO | 00/29157 | 5/2000 |
| WO | 2004/029329 A1 | 4/2004 |

OTHER PUBLICATIONS

Office Action dated Oct. 26, 2011 issued in co-pending U.S. Appl. No. 12/425,685.
Office Action issued in co-pending U.S. Appl. No. 12/425,717 dated Feb. 22, 2010.
Office Action issued in co-pending U.S. Appl. No. 12/425,717 dated Jul. 23, 2010.
Notice of Allowance issued in co-pending U.S. Appl. No. 12/425,717, dated Dec. 1, 2010.
U.S. Office Action issued in co-pending U.S. Appl. No. 10/976,215, dated Apr. 3, 2008.
Exhibit A1, contents of www.chemistryexplained.com/elements/A-C/Chromium.html, downloaded May 24, 2010.
Exhibit A2, "Preliminary Evaluation of PS300: A New Self-Lubricating . . . " NASA TM 107056.
Exhibit A3, contents of U.S. Pat. No. 5,866,518 issued to Dellacorte et al.
Exhibit A4, the contents of of www.juntsu.co.jp/qa/qa0914.html, downloaded May 23, 2010.
Exhibit A5, an english translation obtained from Google of a portion of Exhibit A4.
Grant, Julius "Hack's Chemical Dictionary" Third Edition, McGraw Hill, New York, USA, 1944, p. 169.
Webster's New Collegiate Dictionary, 1977, p. 1311.
Abstract of JP 61-246301 A1 by Tominaga et al., "Production of Corrosion- and Wear-Resisted Sliding Material."
Machine translation of JP 08-327263 by Muroi Masahito, published Dec. 13, 1996.
Translation of JP 61-246301, published Nov. 1986 by Masaharu Tominaga et al.
Kitagawa et al., abstract of "Temperature and where of cutting tools in high-speed machining of Inconel 718 and Ti-6 Al-6V-2Sn", Wear, vol. 202, issue 2, published by Elsevie science, Jan. 1997.
Julius Grant, editor; Hackh's Chemical Dictinary, third edition; McGraw-Hill Book Company, incorporated; New York; 1944 (no month), excerpt pp. 198-199.
Richard J Lewis, Sr., editor; Hawley's Condensed Chemical Dictionary, 12th edition; Van Nostrand Reinhold Company; New York; 1993 (no month), excerpt pp. 279-282.
Office Action issued in co-pending related U.S. Appl. No. 10/976,234 on May 3, 2013.
Office Action issued in co-pending U.S. Appl. No. 12/425,685, dated Aug. 15, 2013.
"Hastelloy X Composition," at http://www.espimetals.com/index.php/online-catalog/82-hastelloy-x-composition (downloaded Jul. 25, 2013).
Espacenet (2010) corresponding to JP 61-246301 A, which corresponds to Exhibit Z cited in Amendment (H) in co-pending U.S. Appl. No. 10/976,234.
Office Action issued in co-pending U.S. Appl. No. 10/976,234 dated Oct. 16, 2013.
Notice of Allowance issued in co-pending related U.S. Appl. No. 10/976,234 on Jun. 22, 2015.
Office Action issued in co-pending related U.S. Appl. No. 12/425,685 on Oct. 26, 2015.
Office Action issued in corresponding Canadian Application No. 2,484,285, mailed Mar. 10, 2010.

* cited by examiner

METHOD FOR COATING SLIDING SURFACE OF HIGH-TEMPERATURE MEMBER, HIGH-TEMPERATURE MEMBER AND ELECTRODE FOR ELECTRO-DISCHARGE SURFACE TREATMENT

This application is a Continuation-in-Part application of U.S. patent application Ser. No. 10/976,234, filed Oct. 29, 2004, which is a Continuation-in-Part Application in the United States of International Patent Application No. PCT/JP03/12088 filed Sep. 22, 2003, which claims priority on Japanese Patent Application No. 295963/2002, filed Oct. 9, 2002 and Japanese Patent Application No. 276860/2002, filed Sep. 24, 2002. The entire disclosures of the above patent applications are hereby incorporated by reference.

BACKGROUND OF THE INVENTION

1. Technical Field of the Invention

The present invention relates to a method for coating a sliding surface of a high-temperature member, the high-temperature member, and an electrode for an electro-discharge surface treatment.

2. Description of the Related Art

FIG. 1 is a schematic diagram of a shrouded turbine blade as an example of a high-temperature member seen from a shroud portion, and FIG. 2 is another perspective view of a shroud section.

The shrouded turbine blade is constituted of a blade portion 1, a dove tail portion 2, and a shroud portion 3. The blade portion 1 is a portion which has a blade-shaped section and in which a rotation power is generated by combustion gas. The dove tail portion 2 is positioned in a terminal end portion of the blade portion 1, and is fixed to a turbine disk (not shown) to transmit the rotation power to the turbine disk. The shroud portion 3 is attached to a blade tip end, and has a function of suppressing vibration or reducing a gas leakage in the tip end.

As shown in this figure, the shroud portions are formed to be integrated with one or a plurality of blade portions 1, and are assembled to closely contact with one another. The closely contact surface (abutment surface) is simply linear as seen from a radial direction in some case, and is stepped midway in the other case as in this example. The surface stepped midway will hereinafter be referred to as "Z-notched".

For a Z-notched shroud portion, shroud portions disposed adjacent to each other as shown by a two-dot chain line in FIG. 1 abut on each other on side surfaces A, B of a Z notch 3a to hold the entire position. Therefore, the Z-notched shroud portions have characteristics that the portions have a high position hold capability without being connected to each other.

However, the turbine blade rotate at a high speed during operation, and not only undergoes periodic deformation and vibration but also is exposed to the combustion gas at a high temperature passed through the turbine blade. Therefore, there is a problem that the side surfaces A, B of the shroud portion receive a high surface pressure at the high temperature while rubbing, and are severely abraded. It is to be noted that the sliding surfaces A, B are not fixed, and one surface is defined as A while the surface abutting on the one surface is defined as B.

To solve the problem, a hard heat-resistant/wear-resistant metal has heretofore been build-up welded or thermally sprayed to the surfaces disposed adjacent to the Z notch of the turbine blade and sliding against each other (side surfaces A, B, hereinafter referred to as "sliding surfaces A, B") (e.g., [Reference 1]).

[Reference 1]

Japanese Laid-Open Patent Publication No. 2001-152803

However, for the build-up welding and thermally spraying, a layer forming rate is high, but there are problems that soundness/adhesion of layers, dimensional precision, and workability are bad, and automation is difficult. There are also problems that a pre-treatment/post-treatment are necessary and cost is high.

On the other hand, as shown in FIGS. 3 and 4, a large number of fitting portions 5 are used in a turbine high-temperature section. As shown in FIG. 5, a large number of sliding surfaces exist even in a stator blade segment of a compressor. A rear stage of the compressor has a high temperature during the operation.

The fitting portions of the turbine high-temperature section and the sliding surfaces of the compressor rub against each other during the operation and are therefore easily worn, and need to be coated with a high-temperature wear-resistant material. Therefore, a hard material has heretofore been attached to the surface by welding or thermal spraying. That is, a surface layer of a component is activated with grinding or blast before the welding or the thermal spraying. Subsequently, a Stellite-based alloy is built up by the welding or the thermal spraying, and grinding processing is carried out to remove an excess metal and to secure dimensions after the welding or the thermal spraying. However, there are problems that the fitting portions are narrow trenches, the welding or the thermal spraying is not easily carried out, and the portions of conventional materials are easily worn.

On the other hand, a technique for coating the surface of the metal material by in-liquid electro-discharge to impart corrosion and wear resistances has already been applied for a patent and well known. Main points of this technique are as follows. First, powders of tungsten carbide (WC) and Co are mixed, compressed, and molded into an electrode, the in-liquid electro-discharge is carried out with the electrode, and an electrode material is deposited on a work. Thereafter, re-melting electro-discharge processing is carried out on the electrode material deposited on the work by another electrode (e.g., a copper electrode, graphite electrode, and the like), and a higher hardness and adhesion are obtained in this method. This related art will hereinafter be described.

First, a second related art will be described (e.g., refer to Reference 2). A mixed green compact electrode of WC—Co is used to perform the electro-discharge processing on the work (mother material S50C) in the liquid and to deposit WC—Co (primary processing). Subsequently, re-melting processing (secondary processing) is carried out by an electrode, which is not worn out very much such as a copper electrode. Only with the deposition of the primary processing, a coat layer has a hardness (Vickers hardness) of about Hv=1410 and includes a structure in which there are many hollows. However, by the secondary processing which is the re-melting processing, the hollows are eliminated, and a coat layer having an improved structure indicating a hardness of Hv=1750 is obtained. In accordance with the method of the second related art, a hard coat layer having good adhesion is obtained with respect to a steel material. However, it is difficult to form the coat layer having a strong adhesion on the surface of a sintered material such as a sintered hard alloy.

Next, in accordance with a third related art by the present applicant, it has been clarified that the material forming hard carbide such as Ti is used as the electrode to generate the electro-discharge between the electrode and a metal material constituting the work, and then a strong hard coating layer can be formed on the surface of the metal as the work without any re-melting process (e.g., see Reference 3). This is because the electrode material worn by the electro-discharge reacts with carbon C that is a component in dielectric liquid to generate titanium carbide (TiC). Furthermore, it has been found that when the electro-discharge is generated between the metal material of the work and the green compact electrode of hydride of the metal such as titanium hydride ($TiH_2$), the hard coating layer having good adhesion can be formed more quickly as compared with the use of the material such as Ti. It has further been found that when the electro-discharge is generated between the metal material of the work and the green compact electrode obtained by mixing hydride such as $TiH_2$ with another metal or ceramic, a hard coating layer having various properties such as hardness and wear resistance can quickly be formed.

Moreover, in accordance with a fourth related art, it has been found that a surface treatment electrode having a high strength can be prepared by preliminary sintering (e.g., see Reference 4). As one example of the fourth related art, the preparation of the electrode for the electro-discharge surface treatment, constituted of a mixed powder of WC and Co powders will be described. For the green compact obtained by mixing, compressing, and molding the WC and Co powders, the WC and Co powders may simply be mixed, compressed, and molded. However, when the powders are compressed/molded after mixing wax, moldability of the green compact is more preferably improved. However, the wax is an insulating material. Therefore, when a large amount of wax is left in the electrode, electric resistance of the electrode increases, and therefore electro-discharge properties are degraded. Therefore, it is necessary to remove the wax. When the green compact electrode is charged and heated in a vacuum furnace, the wax can be removed. At this time, when the heating temperature is excessively low, the wax cannot be removed. When the temperature is excessively high, the wax turns to soot, and purity of the electrode is degraded. Therefore, the heating temperature needs to be kept at a temperature which is not less than a temperature to melt the wax and which is not more than a temperature to decompose the wax and to turn to soot. Next, the green compact in the vacuum furnace is heated by a high-frequency coil and calcined to such an extent that a strength can bear machining, such that the compact is not excessively hardened, and exhibits a hardness like that of chalk. However, a contact portion between carbides is calcined at a comparatively low sintering temperature such that coupling is advanced but weak coupling is achieved before real sintering. It is known that when the electro-discharge surface treatment is carried out with this electrode, a dense and homogeneous coat can be formed.

Next, in accordance with a fifth related art, it has partially been seen that various functions can be imparted to the coating layer by adjustment of materials to be blended as the electrode materials (e.g., see Reference 5). In this fifth related art, it is disclosed that lubricating properties can be imparted to the coating layer by mixture of a material indicating the lubricating properties with the electrode.

Moreover, in a method disclosed in a sixth related art, the work is used as a cathode, any of W or WC, Stellite-based alloy, $TiB_2$ (titanium boride), and $Cr_3C_2$ (chromium carbide) is formed in a rod-shaped electrode to carry out the electro-discharge processing, and fixing layers such as W or WC, Stellite-based alloy, $TiB_2$, and $Cr_3C_2$ are formed on the surface of the work. Thereafter, W or WC, $Cr_3C_2$, Co, Cr, Al, Y, and the like are thermally sprayed to the surface of the fixing layer, and thereafter the surface is further subjected to plasma processing to obtain the wear resistance (e.g., see Reference 6).

Next, in a seventh related art, an electrode for the electro-discharge processing, formed of $Cr_3C_2$ and the like to inhibit the wear on the electrode is disclosed (e.g., see Reference 7). In a method disclosed in an eighth related art, the materials such as WC, TaC, TiC, cBN (cubic boron nitride), and diamond are used as the electrode material to attach the electrode material melted by the electro-discharge in the atmosphere to the work, and the coating layer is formed (e.g., see Reference 8). Furthermore, a ninth related art relates to an electro-discharge surface treatment technique, and lubricating materials such as BN are added to the electrode for the electro-discharge surface treatment to impart a lubricating function to the coating layer (e.g., see Reference 9).

[Reference 2]
Japanese Laid-Open Patent Publication No. 5-148615 (pages 3 to 5)
[Reference 3]
Japanese Laid-Open Patent Publication No. 9-192937 (page 9)
[Reference 4]
WO99/58744 (pages 18 to 20)
[Reference 5]
WO00/29157 (pages 6 to 7)
[Reference 6]
Japanese Laid-Open Patent Publication No. 8-81756 (pages 2 to 3)
[Reference 7]
Japanese Laid-Open Patent Publication No. 3-66520 (page 2)
[Reference 8]
Japanese Laid-Open Patent Publication No. 8-53777 (page 3)
[Reference 9]
Japanese Laid-Open Patent Publication No. 2001-279465 (pages 4 to 5)

However, in some of the electro-discharge surface treatments disclosed in the above-described second to ninth related arts, the lubricating materials are added to form a functional coating layer, but in most of the arts, the wear resistance at room temperature is focused on, and therefore the coating layer of the hard material such as TiC is formed on the surface of a material to be processed.

On the other hand, in recent years, there has been a strong demand for a coating layer that has wear resisting properties under a high-temperature environment or lubricating properties. FIG. 6 shows a schematic diagram of a turbine blade of a gas turbine engine for an airplane. In this gas turbine engine for the airplane, as shown in the figure, a plurality of turbine blades 201 contact one another and are fixed, and are constituted to rotate around an axis. When the turbine blades 201 rotate during the operation of the gas turbine engine for the airplane, a contact portion A among the shown turbine blades 201 is extremely rubbed and hit under a high-temperature environment. There has been a problem that the wear-resistant coating layer used in the above-described related arts is degraded in hardness or oxidized under the high-temperature environment (700° C. or more) under which the turbine blade is used, and therefore there is hardly wear-resistant effect. Moreover, the coating layer to which the lubricating properties are imparted by the fourth and eighth related arts is based on an assumption of the use at room temperature. The lubricating properties at room temperature is far different in phenomenon and mechanism from those under the high-temperature environment exceeding 700° C. for use in the gas turbine engine for the airplane. These related arts have a problem that the lubricating properties in the high-temperature environment are not considered.

SUMMARY OF THE INVENTION

The present invention has been developed to solve the above-described problems. That is, a first object of the present invention is to provide a method for coating a sliding surface of a high-temperature member and the high-temperature member which is little worn even by sliding movement under a high surface pressure at a high temperature, in which adhesion, dimensional precision, and workability of layers are improved and automation is possible.

Moreover, a second object of the present invention is to provide an electrode for an electro-discharge surface treatment by which a coating layer having wear resistance and lubricating property even under a high-temperature environment can be formed on a workpiece by an electro-discharge surface treatment method.

To achieve the first object, according to the present invention, there is provided a method for coating a sliding surface of a high-temperature member, comprising the steps of: using an electrode for an electro-discharge treatment of a green compact of a high-temperature hard material (4), a material having a lubricating property at a high temperature (6), or a mixture of the high-temperature hard material (4) and the material having the lubricating property at the high temperature (6) on a sliding surface which contacts another member under a high-temperature environment to generate a pulsed electro-discharge between the electrode and the sliding surface; and forming a coating layer of a constituting material of the electrode for the electro-discharge surface treatment or a reactant of the constituting material on the sliding surface by electro-discharge energy.

Further, according to the present invention, there is provided a method for coating a sliding portion, comprising the steps of: subjecting a sliding surface A which contacts another member under a high-temperature environment to an electro-discharge surface treatment with a high-temperature hard material (4), a material having a lubricating property at a high temperature (6), or a mixture of the high-temperature hard material (4) and the material having the lubricating property at the high temperature (6), the electro-discharge surface treatment being a treatment of generating a pulsed electro-discharge between an electrode for the electro-discharge surface treatment and a workpiece in dielectric liquid or gas, so that a constituting material of the electrode for the electro-discharge surface treatment or a reactant of the constituting material forms into a coating layer on the surface of the workpiece by electro-discharge energy; and subjecting a sliding surface B that will abut on the sliding surface A to a welding, thermal spraying, or electro-discharge surface treatment with the material having the lubricating property at the high temperature (6).

According to the present invention, there is provided a method for coating a sliding portion, comprising the steps of: subjecting a sliding surface A which contacts another member under a high-temperature environment to an electro-discharge surface treatment with a high-temperature hard material (4), a material having a lubricating property at a high temperature (6), or a mixture of the high-temperature hard material (4) and the material having the lubricating property at the high temperature (6); and subjecting the sliding surface B that will abut on the sliding surface A to the electro-discharge surface treatment with the high-temperature hard material (4), the material having the lubricating property at the high temperature (6), or the mixture of the high-temperature hard material (4) and the material having the lubricating property at the high temperature (6).

Furthermore, according to the present invention, there is provided a method for coating a sliding surface, comprising the steps of: subjecting a sliding surface which contacts another member under a high-temperature environment to an electro-discharge surface treatment with a material having a lubricating property at a high temperature (6) in a porous manner; and filling pores with a solid lubricating material (7).

Preferably, the method further comprises the step of: to fill the pores with solid lubricating material, mixing the solid lubricating material in volatile solvent to brush-coat the material; or mixing the solid lubricating material in a soft rubber to be filled in the pores by rubbing.

Preferably, the solid lubricating material (7) is chromium oxide ($Cr_2O_3$), or a mixture of chromium oxide ($Cr_2O_3$) and silicon.

Preferably, the method further comprises the step of: performing a heating treatment after performing the electro-discharge surface treatment with the material having the lubricating property at the high temperature (6).

Preferably, the high-temperature hard material (4) is any one or a mixture of cBN, TiC, TiN, TiAlN, $TiB_2$, WC, $Cr_3C_2$, SiC, ZrC, VC, $B_4C$, $Si_3N_4$, $ZrO_2$, and $Al_2O_3$.

Preferably, the material having the lubricating property at the high temperature (6) contains chromium and/or chromium oxide ($Cr_2O_3$) and/or hBN.

Preferably, the material having the lubricating property at the high temperature (6) contains 10% or more of chromium, and does not contain 20% or more of nickel.

Further, according to the present invention, there is provided a high-temperature member having a sliding surface which will contact another member under a high-temperature environment and on which a coating layer of a constituting material of an electrode for an electro-discharge surface treatment or a reactant of the constituting material is formed by the electro-discharge surface treatment in which the electrode of a green compact of a high-temperature hard material (4), a material having a lubricating property at a high temperature (6), or a mixture of the high-temperature hard material (4) and the material having the lubricating property at the high temperature (6) is used to generate a pulsed electro-discharge between the electrode and the sliding surface, the sliding surface contacting another member under a high-temperature environment.

According to the present invention, there is provided a high-temperature member comprising: one sliding surface which will contact the other sliding surface on another member under a high-temperature environment and which is subjected to a electro-discharge surface treatment with a high-temperature hard material (4), a material having a lubricating property at a high temperature (6), or a mixture of the high-temperature hard material (4) and the material having the lubricating property at the high temperature (6), wherein the other sliding surface is welded, thermally sprayed, or subjected to the electro-discharge surface treatment with the material having the lubricating property at the high temperature (6).

Furthermore, according to the present invention, there is provided a high-temperature member comprising: one sliding surface which will contact the other sliding surface on another member under a high-temperature environment and which is coated with a high-temperature hard material (4), a material having a lubricating property at a high temperature (6), or a mixture of the high-temperature hard material (4) and the material having the lubricating property at the high temperature (6), wherein the other sliding surface is subjected to an electro-discharge surface treatment with the high-temperature hard material (4), the material having the lubricating property at the high temperature (6), or the mixture of the high-temperature hard material (4) and the material having the lubricating property at the high temperature (6).

According to the present invention, there is provided a high-temperature member comprising: a sliding surface which will contact another member under a high-temperature environment and which is subjected to an electro-discharge surface treatment with a material having a lubricating property at a high temperature (6) in a porous manner, wherein pores are filled with a solid lubricating material (7).

Preferably, the solid lubricating material (7) is chromium oxide ($Cr_2O_3$), or a mixture of chromium oxide ($Cr_2O_3$) and silicon (Si).

Preferably, after performing the electro-discharge surface treatment is performed with the material having the lubricating property at the high temperature (6), a heating treatment is performed such that the sliding surface has a tensile strength of 40 MPa or more.

Preferably, the material having the lubricating property at the high temperature (6) contains chromium and/or chromium oxide ($Cr_2O_3$) and/or hBN.

Furthermore, according to the present invention, there is provided a gas turbine component or an axial flow compressor component comprising the high-temperature member, which is a turbine rotor blade, a stator blade segment, a compressor stator blade segment, a combustor of a gas turbine, or a stationary component of the turbine or an afterburner.

According to the method and high-temperature member of the present invention, when the sliding surfaces A, B are subjected to the electro-discharge surface treatment with the high-temperature hard material (4), high-temperature hardness of the sliding surfaces A, B can be enhanced. When the sliding surfaces A, B is subjected to the electro-discharge surface treatment with the material having the lubricating property at the high temperature (6), the lubricating property of the sliding surfaces A, B at the high temperature can be enhanced. Furthermore, when both the high-temperature hard material (4) and the material having the lubricating property at the high temperature (6) are used in the electro-discharge surface treatment, high-temperature hardness and high-temperature lubricating property can simultaneously be enhanced.

Moreover, when the material having the lubricating property at the high temperature (6) is used in the electro-discharge surface treatment in the porous manner, and the pores are filled with the solid lubricating material (7), a stable lubricating property can be obtained from a low temperature of 700° C. or less to a high temperature of 700° C. or more. The material does not come to exhibit the lubricating property by oxidation at the high temperature, but the contained material itself has the lubricating property. Therefore, the material has the lubricating property even at 700° C. or less, and is not easily worn.

Furthermore, after the material having the lubricating property at the high temperature (6) is used in the electro-discharge surface treatment to form the coating layer on the sliding surface, the material is subjected to the heating treatment, the porous structure can be densified and hardened, and a coating inner strength can be enhanced in a thick coating. Moreover, in the electro-discharge surface treatment, a tendency to an amorphous metal structure is seen, but the structure is crystallized and stabilized by the heating treatment, and a change of a dimension at the time of operation can be prevented.

Additionally, in the electro-discharge surface treatment, the coating layer has an adhesion equal to that of the welding, dimensional precision and quality are stable, workability is high, and cost is remarkably low as compared with the welding or thermal spraying. Therefore, a manufacturing cost can largely be reduced.

Moreover, the electro-discharge surface treatment can easily be applied to narrow trench-lie portions such as a fitting portion only by the change of an electrode shape, and a solid heat-resistant/wear-resistant coating layer can easily be formed.

According to a preferable aspect of the present invention, the high-temperature hard material (4) is any one or a mixture of cBN, TiC, TiN, TiAlN, $TiB_2$, WC, $Cr_3C_2$, SiC, ZrC, VC, $B_4C$, $Si_3N_4$, $ZrO_2$, and $Al_2O_3$.

Since these high-temperature hard materials have a very high Vickers hardness at room temperature as described later, and hold a high hardness even at the high temperature, the high-temperature hardness of the sliding surfaces A, B of the high-temperature member can largely be enhanced.

The material having the lubricating property at the high temperature (6) contains chromium and/or chromium oxide ($Cr_2O_3$) and/or hBN. The material having the lubricating property at the high temperature (6) preferably contains 10% or more of chromium, and does not contain 20% or more of nickel.

Chromium is oxidized at the high temperature to produce oxide, and fulfills the lubricating property. Therefore, a chromium-containing coating layer is formed on the sliding surfaces A, B of the high-temperature member to enhance the lubricating property at the high temperature, and the wear resistance can be enhanced equally or more as compared with the related art. When much nickel is contained, oxidation of chromium at the high temperature is inhibited.

As shown in FIGS. 7, 8, when a content of chromium is 10% or less, there is little chromium oxide, and a coefficient of friction is large. When the content of nickel is 20% or more, chromium oxide is not easily formed, and the coefficient of friction is large. Since chromium oxide and hBN themselves have the lubricating property, the lubricating property is indicated even at a low temperature.

The solid lubricating material (7) with which the pores of the porous coating layer are filled is preferably a material of chromium oxide, or a mixture of powders of chromium oxide and silicon. Instead of being oxidized for the lubricating property at the high temperature, the contained material itself has the lubricating property. Therefore, the material has the lubricating property at 700° C. or less, and is not easily worn.

To densify and harden the porous structure by the heating treatment, the material may be heated at 1000° C. for ten minutes or more. Accordingly, a tensile strength of about 100 MPa can be obtained, and peel in a porous layer can be prevented.

Moreover, to achieve the second object, according to the present invention, there is provided an electrode for an electro-discharge surface treatment for use in an electro-discharge surface treatment method of generating a pulsed electro-discharge between the electrode for the electro-discharge surface treatment and a workpiece in dielectric liquid or gas, so that a constituting material of the electrode for the electro-discharge treatment or a reactant of the constituting material forms into a coating layer on the surface of the workpiece by electro-discharge energy, wherein the electrode is made from a green compact of a mixture of a fine powder of a high-temperature hard material having a high hardness at a high temperature, and a fine powder of a high-temperature lubricating material which is oxidized at the high temperature to obtain a lubricating property.

Accordingly, the electrode for the electro-discharge surface treatment made from a mixture of a high-temperature hard material having a high strength at the high temperature, and a high-temperature lubricating material having the lubricating property at the high temperature is used to form a coating layer which is not easily worn even under a high-temperature environment at 700° C. or more on the surface of the workpiece by the electro-discharge surface treatment method.

Further, according to the present invention, there is provided an electrode for an electro-discharge surface treatment for use in an electro-discharge surface treatment method of generating a pulsed electro-discharge between the electrode for the electro-discharge surface treatment and a workpiece in dielectric liquid or gas, so that a constituting material of the electrode for the electro-discharge surface treatment or a reactant of the constituting material forms into a coating layer on the surface of the workpiece by electro-discharge energy, wherein the electrode is made from a high-temperature lubricating material which is oxidized at a high temperature to obtain a lubricating property.

Accordingly, the coating layer which exhibits the lubricating property under a high-temperature environment at 700° C. or more and which is not easily worn is formed on the surface of the workpiece formed by the electro-discharge surface treatment method using the electrode for the electro-discharge surface treatment made from the high-temperature lubricating material having the lubricating material at the high temperature. Moreover, the coating layer which exerts the lubricating property even under a low-temperature environment at 700° C. or less and which is not easily worn is formed on the surface of the workpiece formed by the electro-discharge surface treatment method using the electrode for the electro-discharge surface treatment including the solid lubricating material itself.

Moreover, when a solid lubricating material is filled in the pores of a porous coating layer of the workpiece formed by the electro-discharge surface treatment method using the electrode for the electro-discharge surface treatment made from the high-temperature material having the lubricating property at the high temperature, the coating layer which fulfills the lubricating property and is not easily worn even under the low-temperature environment at 700° C. or less is formed.

Other objects and advantageous characteristics of the present invention would be apparent from the following description with reference to the accompanying drawings.

DESCRIPTION OF THE PREFERRED EMBODIMENT

Figure 1:
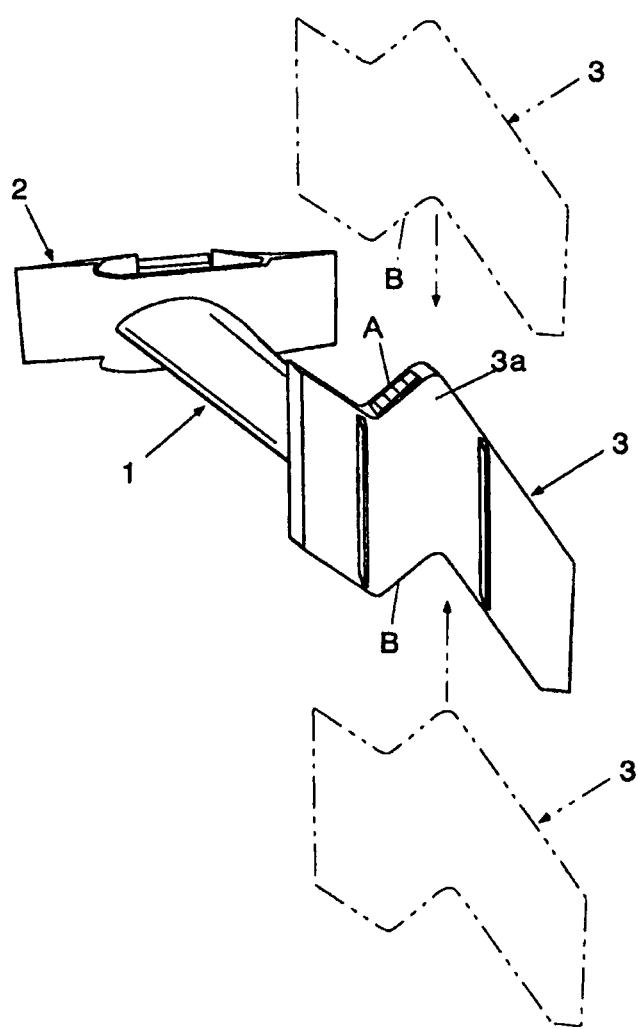
FIG. 1 is a schematic diagram of a shrouded turbine blade seen from a shroud side.
Figure 2:
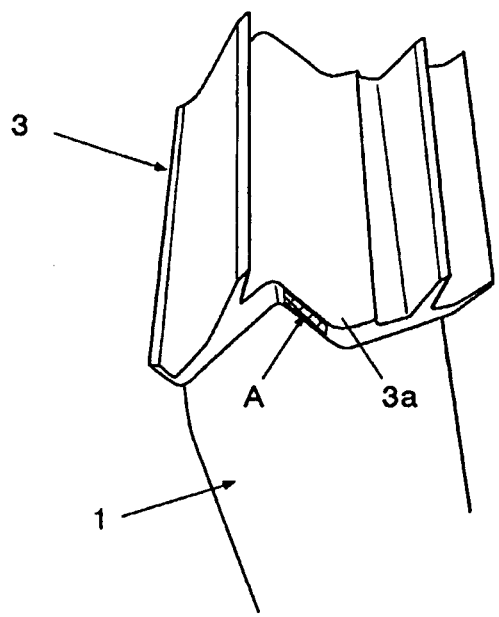
FIG. 2 is a perspective view of a shroud portion.

Preferable embodiments of the present invention will hereinafter be described with reference to the drawings. It is to be noted that components common with the respective drawings are denoted with the same reference numerals, and duplicate description is omitted.

In a coating method of sliding surfaces of a high-temperature member of the present invention, one or both of sliding surfaces A, B of the high-temperature member is subjected to an electro-discharge surface treatment with one or both of a high-temperature hard material (4) and a material having a lubricating property at a high temperature (6), but it is most preferable to subject both the sliding surfaces A, B of the high-temperature member to the electro-discharge surface treatment with both the high-temperature hard material (4) and the material having the lubricating property at the high temperature (6).

Figure 9:
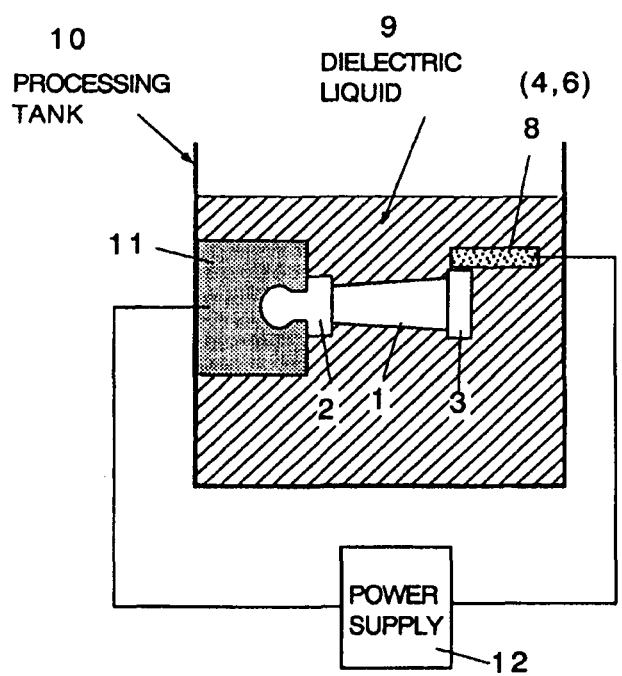
FIG. 9 is a schematic diagram of an electro-discharge surface treatment according to the present invention.

FIG. 9 is a schematic diagram of the electro-discharge surface treatment according to the present invention. An electro-discharge surface treatment technique is disclosed, for example, in Japanese Laid-Open Patent Publication No. 7-197275 "Surface Treatment Method of Metal Material by In-Liquid Electro-discharge". When an oxidation preventive measure and sensitivity of an electrically conductive/insulating servo are improved, the method may also be carried out even in gas.

In FIG. 9, reference numeral 8 denotes an electro-discharge electrode, 9 denotes dielectric liquid, 10 denotes a processing tank, 11 denotes an attachment member, and 12 denotes a power supply. In FIG. 9, a high-temperature member is fixed to the attachment member 11, and the electro-discharge electrode 8 is disposed opposite to the member in the vicinity of the sliding surface A (or B) of the high-temperature member. The dielectric liquid 9 is filled to such a height that at least the sliding surface A (or B) and a part of the electro-discharge electrode 8 are submerged. In this state, electro-discharge is generated between the electro-discharge electrode 8 and the sliding surface A (or B) by the power supply 12, and only the sliding surface A (or B) of the high-temperature member is coated.

Figure 3:
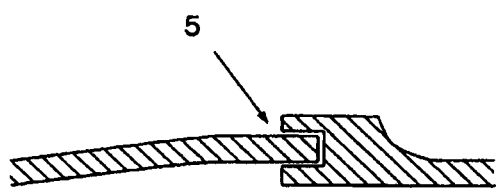
FIG. 3 is a schematic diagram of a fitting portion of a turbine high-temperature section.
Figure 4:
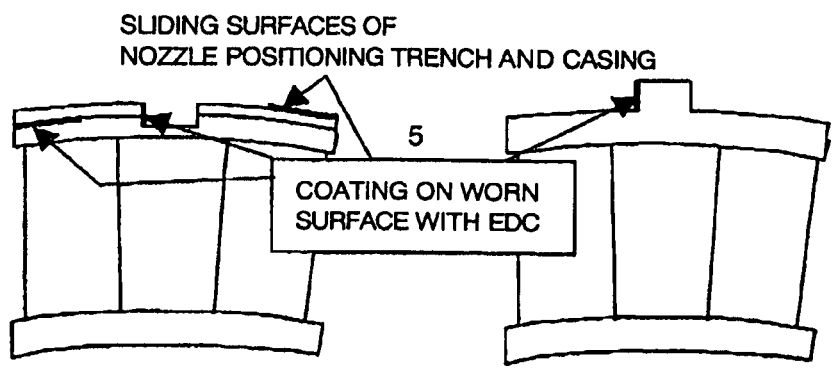
FIG. 4 is a schematic diagram of the fitting portion of a turbine nozzle.
Figure 5:
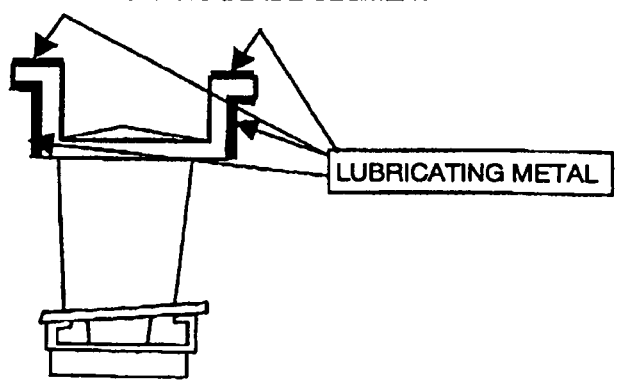
FIG. 5 is a schematic diagram of the fitting portion of a compressor stator blade.
Figure 6:
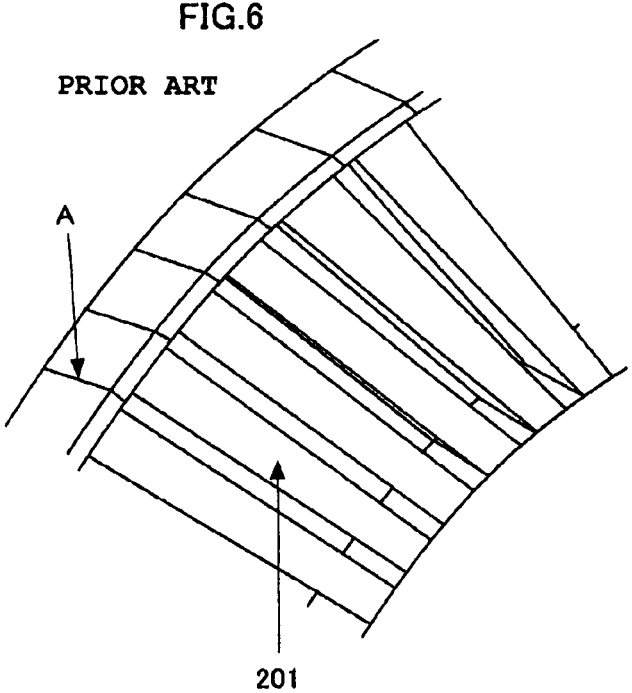
FIG. 6 is diagram showing a part of a gas turbine engine of an airplane.
Figure 7:
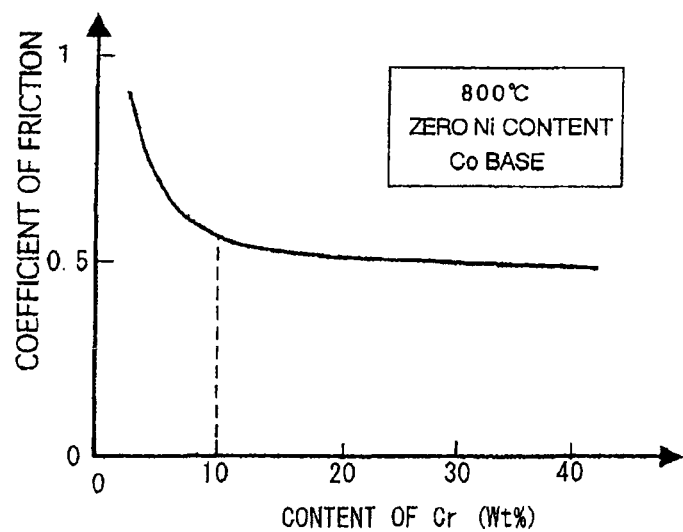
FIG. 7 is a diagram showing a change of a coefficient of friction at a high temperature by a content of Cr.

It is to be noted that even for a narrow trench-shaped portion like a fitting portion of FIG. 3, only the sliding surface A (or B) can similarly be coated only by setting the shape of the electro-discharge electrode 8 so as to be fit for this trench.

In the electro-discharge surface treatment, when a voltage is applied to the high-temperature member and the electro-discharge electrode 8 immersed in the dielectric liquid or gas such as an argon gas and nitrogen, pulsed electro-discharge is generated between the surfaces disposed opposite to each other. The surface of the electro-discharge electrode 8 is peeled and melted by the electro-discharge, the melted material is attached to the sliding surface A (or B) of the shroud portion 3, but the treatment is most preferably carried out in oil.

Since a coating layer thickness is determined in proportion to the electro-discharge pulse number or a electro-discharge treatment time, and the conditions can be changed to control the thickness of the coating in several micrometers, the electro-discharge surface treatment is a coating method optimum for precision components such as a turbine motor blade. Moreover, the coating layer is formed only in a portion where the electro-discharge occurs, and therefore the coating layer can locally be formed on the portion to be coated, and pre-processing such as masking is unnecessary. Moreover, post treatments such as excessive thickness removal and dimension securing are also unnecessary. Heat input per pulse of the electro-discharge is remarkably small, and a turbine motor blade is hardly thermally deformed.

In the method of the present invention, as the electro-discharge electrode 8, powders of the high-temperature hard material 4 and/or the material having the lubricating property at the high temperature 6 are mixed, compressed, and molded for use. The high-temperature hard material 4 may also be any or a mixture of cBN, TiC, TiN, TiAlN, TiB$_2$, WC, Cr$_3$C$_2$, SiC, ZrC, VC, B$_4$C, Si$_3$N$_4$, ZrO$_2$, and Al$_2$O$_3$. TiC is preferable at a use temperature of the component of 900° C. or less, cBN is preferable at 900° C. or more and 1000° C. or less, and Al$_2$O$_3$, ZrO$_2$ are preferable at 1000° C. or more.

By the use of the high-temperature hard material (4) in the electrode for the electro-discharge surface treatment, the materials form a coating layer, and the sliding surface can be coated with a very hard fine ceramic (e.g., Vickers hardness is 4500 with cBN) at a low cost.

Moreover, the material having the lubricating property at the high temperature (6) indicates chromium, chromium oxide, hBN, or an alloy of cobalt containing these which is a major component. The chromium-containing material preferably contains 10% or more of chromium, and does not contain 20% or more of nickel.

When the material having the lubricating property at the high temperature (6) is used in the electrode for the electro-discharge surface treatment, the material forms the coating layer, and the lubricating property at the high temperature can be enhanced at the low cost.

Therefore, the processing cost largely decreases as compared with a conventional build-up welding or thermal spraying process.

When the chromium-containing material is used in the material having the lubricating property at the high temperature (6), the lubricating property at the high temperature can be enhanced. This respect will be described in detail.

Figure 10:
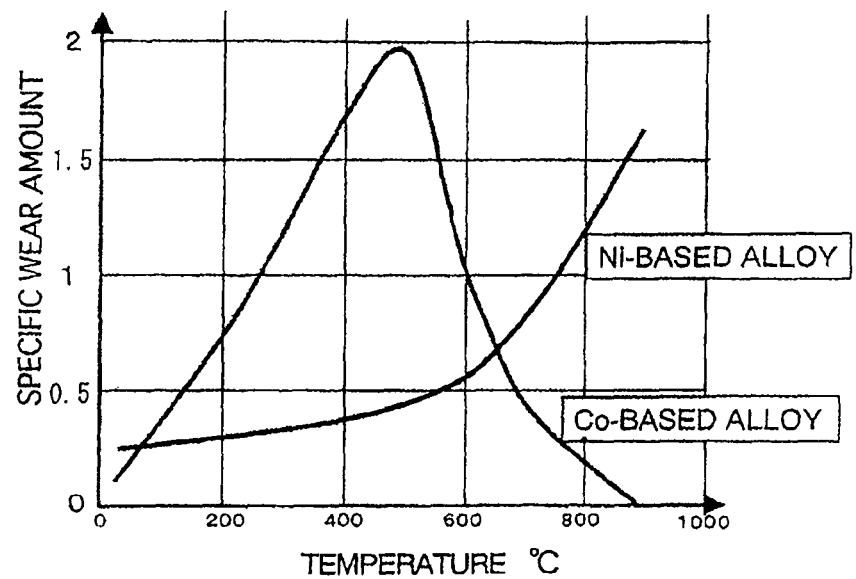
FIG. 10 is a diagram showing comparison of a wear amount of an Ni base with that of a Co base.

FIG. 10 is a diagram showing comparison of a wear amount of a chromium-containing Ni-based alloy with that of a Co-based alloy. From this figure, the wear amount drops for the cobalt-based alloy in a high-temperature range of 700 to 900° C. Additionally, it is seen that the wear amount rapidly increases in a high-temperature range for a nickel-based alloy.

Figure 11:
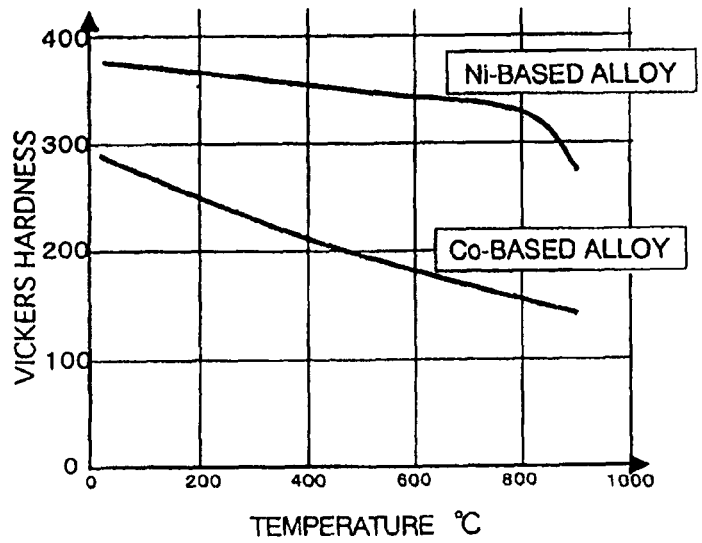
FIG. 11 shows comparison of Vickers hardness at the high temperature.

FIG. 11 shows comparison of Vickers hardness at the high temperature. It is seen from this figure that Ni-based Inconel 713LC is relatively high in hardness even at the high temperature. However, although Ni-based Inconel 713LC is hard, the material is remarkably worn at the high temperature as described later.

Figure 12:
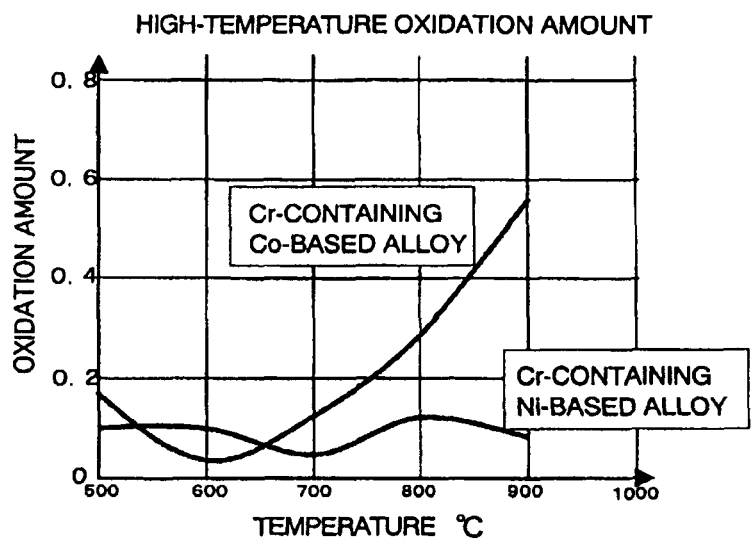
FIG. 12 is a comparative diagram of a high-temperature oxidation amount.

FIG. 12 is a comparative diagram of a high-temperature oxidation amount. Although an Inconel material contains Cr, the material is not much oxidized at the high temperature, Cr$_2$O$_3$ is not formed, and low wear is not achieved. On the other hand, for the Co-based alloy, Cr is oxidized to form Cr$_2$O$_3$, and the low wear is supposedly achieved.

Figure 8:
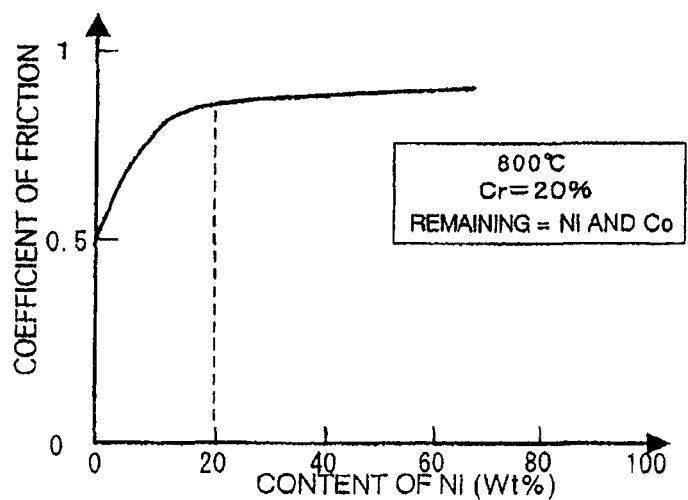
FIG. 8 is a diagram showing an increase of friction at the high temperature by the content of Ni.
Figure 13:
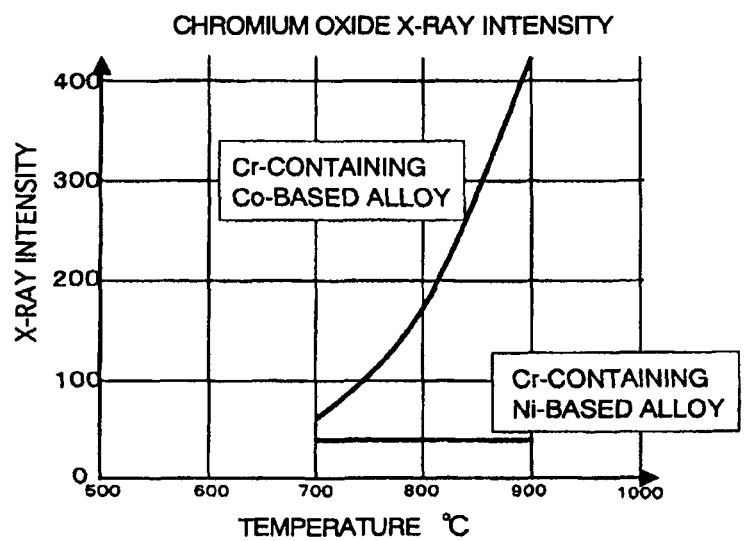
FIG. 13 is a comparative diagram of an X-ray intensity of chromium oxide at the high temperature.

FIG. 13 is a comparative diagram of an X-ray intensity showing an amount of chromium oxide at the high temperature. In the chromium oxide amount produced on the surface of the metal, Co-based oxide rapidly increases at a temperature of 700° C. Cobalt does not inhibit the oxidation of chromium. On the other hand, even with a rise of temperature, the chromium oxide amount does not change and indicates a low value in the Ni-based alloy. From this, it is seen that a large difference is produced in the wear amount by the presence/absence of oxide as shown in FIG. 8.

Figure 14A:
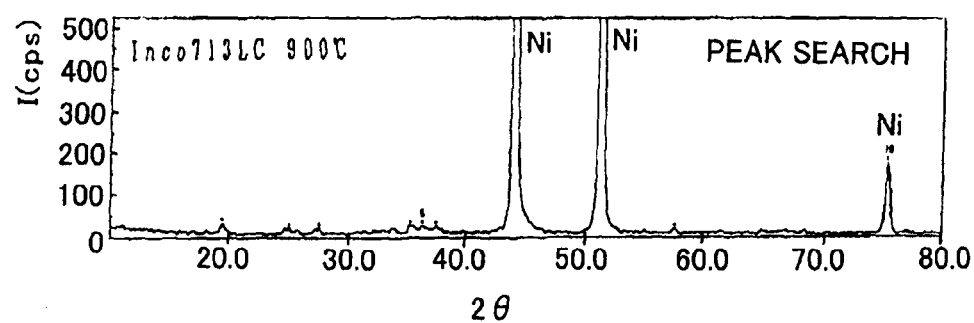
FIGS. 14A and 14B show X-ray analysis results.
Figure 14B:
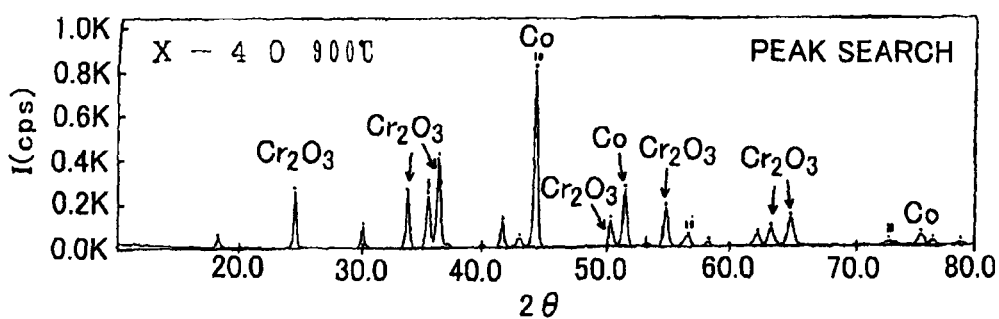

FIGS. 14A and 14B show X-ray analysis results of the material after the heating at 900° C. In this figures, FIG. 14A shows Ni-based Inconel 713LC, and FIG. 14B shows the Co-based alloy (X-40). It is also seen from this comparison that Cr$_2$O$_3$ cannot apparently be formed in the Ni-based alloy.

Figure 15:
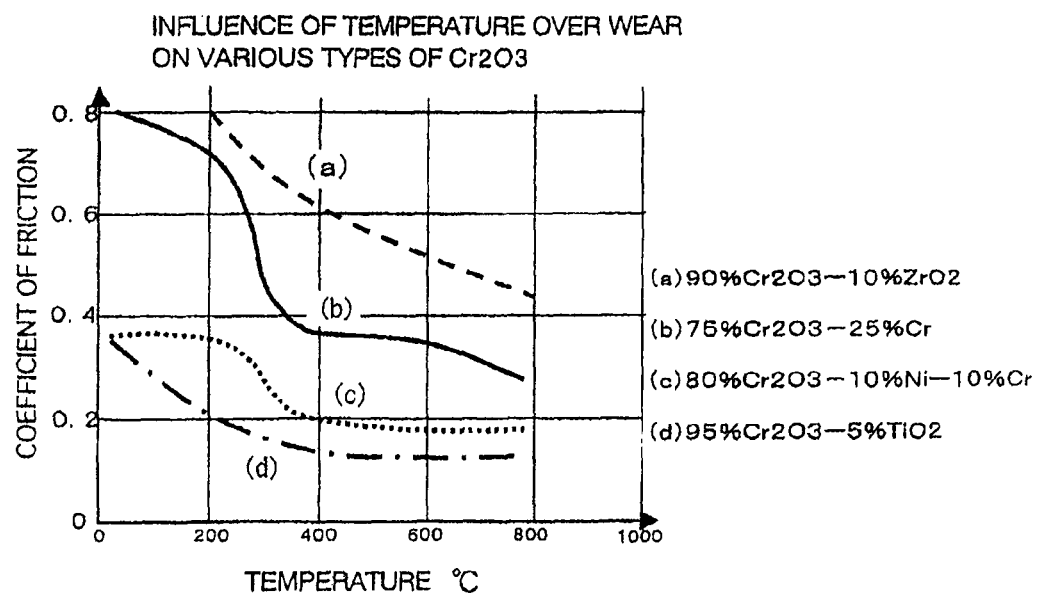
FIG. 15 is a diagram showing a low coefficient of friction of $Cr_2O_3$ at the high temperature.

Moreover, FIG. 15 is a diagram showing a coefficient of friction of Cr$_2$O$_3$ at the high temperature. It is seen from this figure that Cr$_2$O$_3$ indicates a low friction at the high temperature, and the coefficient of friction drops especially at around 300° C., and is remarkably small at around 700° C.

It is seen from the above-described characteristics of Cr$_2$O$_3$ that the lubricating property at the high temperature can be enhanced by the use of the chromium-containing material having the lubricating property at the high temperature 6. Similarly, the lubricating property at the high temperature can also be enhanced by the use of the Cr$_2$O$_3$ or hBN-containing material having the lubricating property at the high temperature 6.

The sliding surface A and/or B of the high-temperature member is subjected to the electro-discharge surface treatment with the material having the lubricating property at the high temperature 6 in the porous manner, and the solid lubricating material 7 is mixed in volatile solvent, and the pore is filled with the solid lubricating material 7 by brush coating, for example. Accordingly, the lubricating property can be enhanced even at 600° C. or less.

Moreover, diffusion coupling of the structure in the coating advances by the heating treatment, and densification and strengthening of the structure are realized.

The sliding surface A and/or B of the high-temperature member is subjected to the electro-discharge surface treatment with the material having the lubricating property at the high temperature (6), the solid lubricating material (7) is mixed in the volatile solvent and filled in the pores by the brush coating or mixed with a soft rubber and filled in the pores by rubbing, and accordingly the lubricating property can be enhanced even at 700° C. or less. The porous structure preferably has a porosity of 10% or more. As an example of the solid lubricating material (7), chromium oxide (Cr$_2$O$_3$) or a mixture of chromium oxide (Cr$_2$O$_3$) and silicon is used.

As one example, when the pores are filled with solid lubricating material $Cr_2O_3$, the lubricating property is imparted, and the material is not worn regardless of the temperature. When the solid lubricating material of $Cr_2O_3$ mixed with Si is filled in the pores, the wear is remarkably little at 480° C. Si is oxidized to form $SiO_2$, and liquefied glass and solid lubricating material $Cr_2O_3$ produce a synergistic effect.

Figure 16:
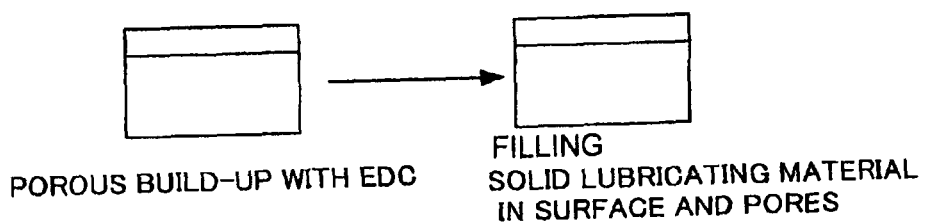
FIG. 16 is a schematic diagram showing that a solid lubricating material fills pores of a porous structure.

Table 1 shows a test result indicating the effect of the solid lubricating material, and FIG. 16 is a schematic diagram showing that the solid lubricating material is filled in the pores of the porous structure.

TABLE 1

Example of test result of difference of wear at
intermediate temperature
Test conditions:
480° C. in the atmospheric air (after once heating at 760° C.)
Surface pressure: 7 MPa
Amplitude: 1.0 (±0.5)
Cycle number: $10^6$

|  | Wear amount (micron) |
|---|---|
| Porous build-up of Stellite 31 | 190 |
| Stellite 31 filled with $Cr_2O_3$ | 50 |
| Stellite 31 filled with $Cr_2O_3$ and Si | 5 |

The porous structure has a small tensile strength and has a possibility of peel. To solve this, the structure is heated at the high temperature to promote diffusion among particles, and a coupling strength is increased.

Table 2 shows the test result of the tensile strength.

TABLE 2

| Tensile strength | |
|---|---|
|  | MPa |
| Electro-discharge coating as such | 32 |
| After high-temperature heat treatment | 99 |

As one example, when the layer of the electro-discharge surface treatment is heated/treated at 1000° C. or more for ten minutes or more, the diffusion coupling of the structure in the coating advances, and the densification and strength enhancement of the structure are realized.

EXAMPLES

Examples of the present invention will hereinafter be described.

For the high-temperature material in the present invention, the turbine blade will be described in accordance with an example.

Table 3 is a major component table of a mother material (Inconel 713LC) of the turbine blade, a build-up material T onto the sliding surface by the welding, and a Stellite-based lubricating material which is a coating material onto the sliding surface by the electro-discharge surface treatment. The mother material has a small content of Cr and Co, but the material having a large content of these is used in the build-up material T and Stellite-based lubricating material. The build-up material T and Stellite-based lubricating material correspond to the material having the lubricating property at the high temperature 6.

TABLE 3

| Material name | Cr | Co | Mo | Ni | W |
|---|---|---|---|---|---|
| Inconel 713LC | 12 | 0 | 4.5 | Balance | — |
| build-up material T | 18 | 49 | 29 | — | — |
| Stellite-based lubricating material | 25 | 56 | — | 10 | 7 |

Table 4 shows the Vickers hardness of cBN and various types of carbides which are high-temperature hard materials at room temperature.

On the other hand, the mother material, build-up material T, and Stellite lubricating material of Table 3 have a low Vickers hardness of about 300 to 400. Additionally, it is known that the hardness rapidly drops at 600° C. or more, and at a high temperature of 700 to 800° C., the hardness drops to about ½ of that at room temperature.

TABLE 4

| Vickers hardness (room temperature) | | | | | |
|---|---|---|---|---|---|
| cBN | TiC | SiC | $Cr_3C_2$ | WC | $ZrO_2$ |
| 4500 | 3200 | 2400 | 2280 | 2200 | 1300 |

Table 5 shows the test conditions for testing the wear on the sliding surface for confirming the effect of the present invention, and the conditions are set to those close to operation conditions of an actual jet engine.

TABLE 5

| Temperature | Surface pressure | Cycle number | Vibration number | Amplitude |
|---|---|---|---|---|
| 815° C. | 7 MPa | $1 \times 10^7$ | 95 Hz | 0.35 mm |

Table 6 shows comparison of the test results, and shows the test material and the degree of wear.

TABLE 6

| No. | Conditions | Upper test piece | Lower test piece |
|---|---|---|---|
| 1 | Mother materials | Inconel 713LC | Inconel 713LC |
| 2 | Lubricating build-up welds | Build-up material T; build-up welding | Build-up material T; build-up welding |
| 3 | Hard EDCs (ceramic-based) | $Cr_3C_2$ + 5% Ni; EDC | $Cr_3C_2$ + 5% Ni; EDC |
| 4 | Lubricating EDCs (Stellite-based) | Stellite-based lubricating material; EDC | Stellite-based lubricating material; EDC |
| 5 | Hard EDC and lubricating build-up welding | $Cr_3C_2$ + 5% Ni; EDC | Build-up material T; build-up welding |

TABLE 6-continued

| | | | |
|---|---|---|---|
| 6-1 | Hard EDCs (cBN) | cBN (Ni plating coat); EDC | cBN (Ni plating coat); EDC |
| 6-2 | Hard EDCs (TiC) | TiC; EDC | TiC; EDC |
| 7 | (Hard + lubricating) EDCs | 50% $Cr_3C_2$ + 20% Cr + 30% Co; EDC | 50% $Cr_3C_2$ + 20% Cr + 30% Co; EDC |
| 8 | (Hard + lubricating) EDCs | 50% cBN + 20% Cr + 30% Co; EDC | 50% cBN + 20% Cr + 30% Co; EDC |

| No. | Upper test piece wear amount | Lower test piece wear amount | Judgment |
|---|---|---|---|
| 1 | Large | Large | X |
| 2 | Excessively small | Excessively small | ⊚ but cost is high |
| 3 | Large | Large | X |
| 4 | Small | Small | ○ cost is medium but thick build-up is possible and there is practical usability |
| 5 | Excessively small | Excessively small | ⊚ but cost is medium |
| 6-1 | Excessively small | Excessively small | ⊚ cost is low |
| 6-2 | Small | Small | ⊚ cost is excessively low |
| 7 | Medium | Medium | Δ |
| 8 | Excessively small | Excessively small | ⊚ cost is low |

In this table, for treatment number 1, both materials are the mother materials, wear is excessively large, and this treatment cannot be applied. Treatment number 2 shows a conventional example (build-up welding), and the wear is little, but the cost is high. The treatment numbers 1 and 2 show known examples. However, the material is largely worn at 480° C. In Table 6, "conditions" indicates two fictional portions (surfaces) that contact each other to be worn in the experiment.

Treatment number 3 shows an example in which a hard ceramic-based material is used in the electrode, the electro-discharge surface treatment (described as electro-discharge coating (EDC) in Table 6) is applied, and hard chromium carbide ($Cr_3C_2$) having good oxidation resistance at the high temperature is formed into coating layers on the opposite surfaces in order to reduce the cost. It has heretofore been considered from common sense that when the opposite surfaces are hard, the wear is little. However, it is seen from this result that the wear is excessively large simply by the hardening, and the treatment cannot be applied.

Treatment number 4 shows one example of the present invention in which the Stellite-based material having a large content of Cr and having the lubricating property at the high temperature is applied to the opposite surfaces by the electro-discharge surface treatment in the same manner as in 3. In this case, it is seen that the wear amount largely drops and the treatment is applicable.

Furthermore, upper and lower test pieces are subjected to the electro-discharge surface treatment with the Stellite-based lubricating material in the porous manner, and the solid lubricating material which is chromium oxide ($Cr_2O_3$) or a mixture of chromium oxide ($Cr_2O_3$) and silicon is mixed with a soft rubber and filled in the pores by rubbing. Accordingly, the lubricating property can be enhanced even at 700° C. or less. Here, the porosity of the porous structure is preferably 10% or more.

As one example, when the pores are filled with solid lubricating material $Cr_2O_3$, there is the lubricating property, and the material is not worn regardless of the temperature. When the solid lubricating material of $Cr_2O_3$ mixed with Si is filled in the pores, the wear is remarkably little at 480° C. Si is oxidized to form $SiO_2$, and liquefied glass and solid lubricating material $Cr_2O_3$ produce the synergistic effect.

On the other hand, the porous structure has a small tensile strength and has a possibility of peel. To solve this, the structure is heated at the high temperature to promote the diffusion among the particles, and the coupling strength is increased.

As one example, when the layers of the electro-discharge surface treatment are heated/treated at 1000° C. or more for ten minutes or more, the diffusion coupling of the structure in the coating advances, and the densification and strength enhancement of the structure are realized.

Treatment number 5 shows another example of the present invention in which one surface is subjected to the electro-discharge surface treatment with very hard chromium carbide ($Cr_3C_2$), and on the other surface, the build-up material T having the lubricating material is build-up welded. As a result, it has been found that the wear amount is equal to or less than that of the treatment number 2, and the cost can be reduced by omitting the welding with respect to one surface.

Treatment number 6-1 shows another example of the present invention in which only the hard material of cBN is applied to the opposite surfaces in the electro-discharge surface treatment in the same manner as in 3. With cBN which does not have the lubricating property but which is excessively hard, it is observed that the coefficient of friction is large and the vibration at the time of sliding movement is large, but it is seen that the wear amount largely drops and the treatment is applicable.

Treatment number 6-2 shows another example of the present invention in which only the hard material of TiC is applied to the opposite surfaces in the electro-discharge surface treatment in the same manner as in 3. Although any lubricating material is not used, the coefficient of friction is small, and the hardness is remarkably large. Therefore, it is seen that the wear amount largely drops and the treatment is applicable. It has heretofore been considered that TiC is oxidized at 700° C. or more and is not usable at the high temperature. However, as a result of the high-temperature wear test, it has been seen that in the coating of the mother material of an Ni alloy with TiC, the wear is small and the high-temperature wear resistance is superior even at 1000° C. Additionally, the wear is slightly large at 480° C.

Table 7 shows the high-temperature wear amount of TiC.

TABLE 7

Wear test result
Wear with respect to test temperature (surface pressure = 7 MPa, amplitude = ±0.5 mm, frequency = 40 Hz, cycle number = $10^6$)
Base material: Re77 (Nickel alloy) unit: μm

| ° C. | Re77 | Build-up welding of build-up material T (thickness of 1 mm) | EDC of TiC (thickness of 0.03 mm) |
|---|---|---|---|
| 480 | 40 | 181 | 55*1 |
| 700 |  | 13 | 17 |
| 815 | 750 | 13 | 14 |
| 1000 | Remarkably large | 3 | 25 |
| Coefficient of friction | 07 | 04 | 0.1 to 0.2 |

*1 The coating is worn and eliminated.

Treatment numbers 7, 8 show the other examples of the present invention in which a mixture of hard materials of hard $Cr_3C_2$ and cBN having good resistance to oxidation at the high temperature, and a Cr-containing material having the lubricating property at the high temperature is applied to the opposite surfaces in the electro-discharge surface treatment in the same manner as in 3. Although $Cr_3C_2$ of the treatment number 7 is hard and contains the high-temperature lubricating material, the material is worn. It has been seen that cBN of the treatment number 8 is remarkably hard and also contains the high-temperature lubricating material, therefore the wear amount largely drops, and the treatment is applicable.

In this manner, since the use of a usual lubricating material for use at room temperature is impossible under the high-temperature environment, a measure concerning the wear resistance is insufficient even with the electrode containing only the material having the strength. It has been seen that the effect against the wear can be produced when the material having the strength under the high-temperature environment in the components of the electrode for the electro-discharge surface treatment contains the material capable of fulfilling the lubricating property.

It is to be noted that in the above-described test examples, the examples of the electrode for the electro-discharge surface treatment blended with powders of $Cr_3C_2$+Cr+Co and cBN+Cr+Co have been described, but any material may also be used as long as the material having the high-temperature strength is combined with the material indicating the lubricating property at the high temperature.

Moreover, Cr is mixed in the electrode for the electro-discharge surface treatment as the material indicating the lubricating property at the high temperature in the above-described test examples, but, needless to say, the solid lubricating materials such as hBN may also be mixed instead. The mixture of hBN directly in the electrode is effective for lubrication in a range at a temperature at which a usual lubricant is usable or higher and a temperature at which Cr is oxidized at the high temperature or lower. When Cr and hBN are simultaneously mixed as the material of the electrode for the electro-discharge surface treatment, the coating layer having the lubricating property can be formed over a broad range from a comparatively low temperature to a high temperature exceeding 700° C.

Furthermore, some examples of the high-temperature hard material have been described. Above all, $Cr_3C_2$ has a function of remarkably improving roughness of the surface of the formed coating layer as compared with the use of the other materials, and $Cr_3C_2$ is preferably used as the high-temperature hard material. Since the coating layer formed by the electro-discharge surface treatment is formed by pulse electro-discharge in the dielectric liquid, there is a strong tendency to convex/concave surface, but it is possible to inhibit the surface roughness and to smoothen the surface by the use of $Cr_3C_2$.

As described above, in accordance with the method and high-temperature member of the present invention, when the sliding surface is subjected to the electro-discharge surface treatment with the high-temperature hard material (4), the hardness of the sliding surface can be enhanced. When the sliding surface is subjected to the electro-discharge surface treatment with the material having the lubricating property at the high temperature (6), the lubricating property of the sliding surface at the high temperature can be enhanced. Furthermore, when both the high-temperature hard material (4) and the material having the lubricating property at the high temperature (6) are used in the electro-discharge surface treatment, the hardness and the high-temperature lubricating property can simultaneously be enhanced.

Moreover, in the electro-discharge surface treatment, the adhesion of the coating layer is equal to that in the welding, the dimensional precision and quality are stabilized and the workability is high as compared with the welding or the thermal spraying, and therefore the manufacturing cost can largely be reduced.

Furthermore, the treatment can easily be applied even to the narrow trench-shaped portions such as the fitting portion only by the change of the electrode shape in order to form the coating layer by the electro-discharge.

Additionally, when any or a mixture of cBN, TiC, TiN, TiAlN, $TiB_2$, WC, $Cr_3C_2$, SiC, ZrC, VC, $B_4C$, $Si_3N_4$, $ZrO_2$, and $Al_2O_3$ is used in the high-temperature hard material (4), the high-temperature hardness of the sliding surface of the high-temperature member can largely be enhanced.

Moreover, by the use of the material containing chromium and/or chromium oxide and/or hBN having the lubricating property at the high temperature, the lubricating property is fulfilled at the high temperature, and the resistance to wear can be enhanced to obtain the resistance which is equal to or more than that of the related art.

As described above, the coating method of the sliding surface of the high-temperature member and the high-temperature member of the present invention have superior effects that the wear is little even with the sliding movement under a high surface pressure at the high temperature, the adhesion, dimensional precision, workability of the coating layer are enhanced, the treatment by the electro-discharge is controlled by NC, and the automation is possible.

Next, preferable embodiments of the electrode for the electro-discharge surface treatment according to the present invention will be described in detail.

In the present invention, for the coating layer formed on the surface of the workpiece by the electro-discharge surface treatment method, the electrode material having the high strength and lubricating property even under the high-temperature environment is used. Concretely, the high-temperature hard material having the high strength under the high-temperature environment, selected from cBN, TiC, TiN, TiAlN, $TiB_2$, WC, $Cr_3C_2$, silicon carbide (SiC), ZrC, VC, $B_4C$, $Si_3N_4$, zirconium oxide ($ZrO_2$), and aluminum oxide ($Al_2O_3$) is mixed with the high-temperature lubricating material which is oxidized under the high-temperature environment to obtain the lubricating property to form the electrode material.

As described above, especially Cr is preferably used as the material having the lubricating property under the high-temperature environment in the present invention. This is because $Cr_2O_3$ obtained by the oxidation of Cr has a property that the lubricating property is possessed under the high-temperature environment. Additionally, there are conditions for obtaining $Cr_2O_3$ having the lubricating property by the oxidation of Cr. In an environment where much Ni exists around Cr, Cr does not turn to $Cr_2O_3$, and therefore the lubricating property is not developed under the high-temperature environment. Moreover, when Cr is oxidized to form $Cr_2O_3$, a temperature is required at about 700° C. or more. Since Cr contained in the coating layer is not oxidized at a lower temperature, the effect indicating the lubricating property cannot be anticipated. Therefore, the lubricating property by the mixture of Cr into the electrode can be anticipated for the portion (case) for use at the high temperature. FIGS. 10, 11, 12, 13 show data as a proof for this fact. Conversely, a usual liquid lubricant evaporates in the high-temperature environment at 700° C. or more. The usual chemically synthesized lubricant is decomposed by heat, and is not usable, and therefore the lubricating effect by $Cr_2O_3$ has a significant meaning.

Next, for the electrode for the electro-discharge surface treatment of the present invention, the use of cBN which is the high-temperature hard material and Cr which is the high-temperature lubricating material will be described in accordance with an example.

Figure 17:
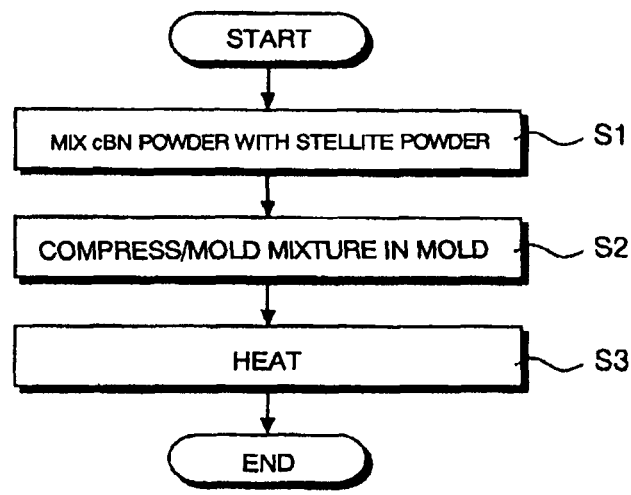
FIG. 17 is a flowchart showing a preparation procedure of an electrode for the electro-discharge surface treatment according to the present invention.

FIG. 17 is a flowchart showing a preparation procedure of the electrode for the electro-discharge surface treatment according to the present invention. First, cBN and Stellite powder are weighed and mixed at a weight ratio of 1:4 (step S1), and charged in a mold (die) having a predetermined shape and subsequently compressed/molded to obtain a green compact (step S2). It is to be noted that Stellite is an alloy containing Co and Cr which are major components and also containing several types of other components. cBN having a particle diameter of 2 to 4 μm, and Stellite having a particle diameter of 1 to 3 μm were used.

Figure 18:
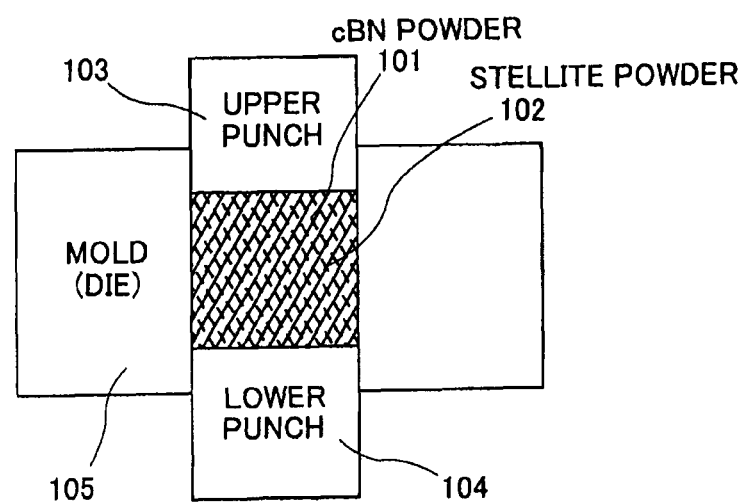
FIG. 18 is a diagram showing a section of a molding unit for preparing the electrode for the electro-discharge surface treatment.

FIG. 18 is a diagram showing a sectional shape of a molding unit for use in compression molding. A lower punch 104 is inserted via a lower part of a hole formed in a mold (die) 105, and a mixture of mixed cBN powder 101 and Stellite powder 102 is charged in a space formed by the lower punch 104 and the mold (die) 105. Thereafter, an upper punch 103 is inserted from an upper part of the hole formed in the mold (die) 105. In this manner, the material is compressed/molded with a pressurizing unit, and the like so that a pressure is applied on the opposite sides of the upper punch 103 and lower punch 104 of a molding unit charged with the mixture of the cBN and Stellite powders, and accordingly the electrode for the electro-discharge surface treatment is prepared. It is to be noted that, if necessary, it is possible to heat/treat the compressed/molded green compact (step S3). By the heating treatment, the strength of the compressed/molded electrode can be increased.

When the cBN powder is mixed with the Stellite powder in the above-described step S1, the wax may also be mixed. After mixing the wax into the powder in this manner, the material is compressed/molded, and the moldability of the green compact is then enhanced. Additionally, the wax is an insulating material. Therefore, when a large amount of wax is left in the electrode, an electric resistance of the electrode is increased, electro-discharge properties are degraded, and it is therefore necessary to remove the wax. As a method of removing the wax, there is a method in which a compressed/molded green compact electrode containing the wax is charged and heated in a vacuum furnace. Accordingly, the wax in the green compact is removed. It is to be noted that the method of the heating in the vacuum furnace corresponds to the process of the step S3. When the material is heated as described above, the strength of the electrode increases.

Figure 19:
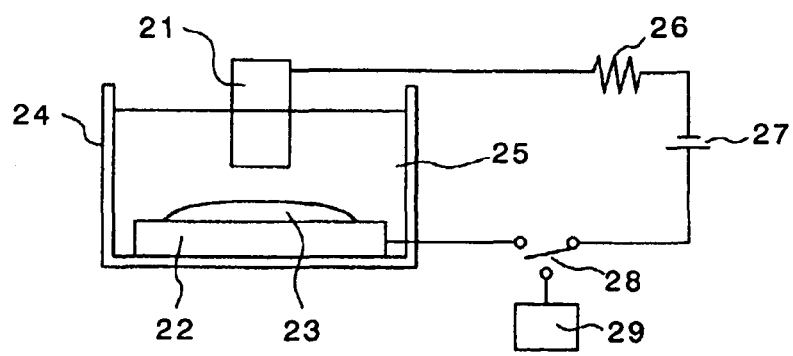
FIG. 19 is a schematic diagram showing a constitution of an apparatus for performing the electro-discharge surface treatment.

FIG. 19 is a block diagram showing an outline of an apparatus for performing the electro-discharge surface treatment method of the present invention. The electro-discharge surface treatment apparatus includes an electrode for the electro-discharge surface treatment 21, processing tank 24, dielectric liquid 25, resistance 26, power supply 27, switching device 28, and control circuit 29. The dielectric liquid 25 mainly containing an insulating oil or water is charged in the processing tank 24, and a workpiece 22 on which the coating layer is to be formed is disposed. The electrode for the electro-discharge surface treatment 21 is the electrode prepared in the above-described steps of FIG. 17, and is disposed opposite to the upper part of the workpiece 22. The electrode for the electro-discharge surface treatment 21 is connected to the workpiece 22 via the resistance 26, power supply 27, and switching device 28. The switching device 28 switches the voltage and current applied to the electrode for the electro-discharge surface treatment 21 and workpiece 22. The switching device 28 is connected to the control circuit 29 which controls the switching device 28 to be on/off. It is to be noted that although not shown, a driving mechanism is disposed at the electrode for the electro-discharge surface treatment 21 and processing tank 24 in order to control the position of the coating layer formed on the surface of the workpiece 22.

When the pulsed electro-discharge is generated between the electrode for the electro-discharge surface treatment 21 of the electro-discharge surface treatment apparatus and the workpiece 22, the material constituting the electrode for the electro-discharge surface treatment 21 floats in the dielectric liquid of the processing portion by heat energy. The floated electrode constituting material or the material obtained by the reaction of the electrode constituting material by the heat energy adheres to the surface of the workpiece 22 to form a coating layer 23. The coating layer 23 is formed on the surface of the workpiece 22 in this manner.

It is to be noted that the present invention has been described in accordance with several preferable embodiments, but it would be understood that the scope included in the present invention is not limited to these embodiments. On the contrary, the scope of the present invention includes all improvements, modifications, and equivalents included in the appended claims.

The method in which the electrode is formed by compression molding of powder using a press is described in the above. However, it is apparent that the method for forming the electrode is not limited to the compression molding as long as the electrode is formed by using powder. As a method for forming the electrode, there are a method that uses slip, a method that uses an MIM (Metal Injection Molding), a method that uses thermal spraying, a method that uses nano powder accompanying a jet stream, and the like. In the method that uses slip, powder is dispersed in a solvent, and the solution is put in a porous mold such as gypsum to remove the solvent so that the electrode can be molded. In the method that uses the MIM, a mixture of powder and binder is kneaded, and then injected into a heated mold. In the method that uses thermal spraying, heated powder is sprayed to combine a part of the sprayed powder, forming the electrode. These methods are different in a manner of forming the electrode, but a purpose of these methods is the same in terms of forming the electrode by using powder. In other words, when the combination of powder reaches a desired state, the combined powder can be then used as the electrode.

The invention claimed is:

1. A high-temperature member having a sliding surface, wherein on the sliding surface a porous coating layer of a constituting material of an electrode for an electro-discharge surface treatment, or a reactant of the constituting material, is formed by the electro-discharge surface treatment in which the electrode is used to generate a pulsed electro-discharge between the electrode and the sliding surface, wherein the electrode is a green compact that includes the constituting material that includes (i) a first coating material that is a cobalt-based alloy comprising 10% or more of chromium, by weight, and does not include 20% or more of nickel, by weight, or (ii) a mixture of the first coating material and a second coating material, wherein the first coating material comprises the chromium that oxidizes at a high temperature environment of 700° C. or more to form $Cr_2O_3$, wherein the second coating material is a material selected from the group consisting of any one of, or a mixture of, cBN, TiC, TiN, TiAlN, $TiB_2$, WC, $Cr_3C_2$, SiC, ZrC, VC, $B_4C$, $Si_3N_4$, $ZrO_2$, and $Al_2O_3$, and wherein the porous coating layer includes the chromium, and the high-temperature member including the porous coating layer formed on the sliding surface has been disposed in a state where the porous coating layer of the sliding surface of the high-temperature member contacts the second member so that the sliding surface contacts the second member under the high temperature environment of 700° C. or more, and the chromium of the porous coating layer oxidizes under the high temperature environment of 700° C. or more to substantially increase formation of $Cr_2O_3$, and wherein the high-temperature member is a finished product.

2. The high-temperature member according to claim 1, wherein the high-temperature member is a turbine rotor blade, a stator blade segment, a compressor stator blade segment, a combustor of a gas turbine, or a stationary component of a turbine or an afterburner.

3. A high-temperature member having a sliding surface adapted to contact a second member under a high-temperature environment of 700° C. or more, and on which a coating layer of a constituting material of an electrode for an electro-discharge surface treatment, or a reactant of the constituting material, is formed by the electro-discharge surface treatment in which the electrode is used to generate a pulsed electro-discharge between the electrode and the sliding surface, and the coating layer includes pores, and the pores are filled with a solid lubricating material, and the solid lubricating material is $Cr_2O_3$, or a mixture of $Cr_2O_3$ and Si, wherein the electrode is a green compact that includes the constituting material that includes (i) a first coating material that is a cobalt-based alloy comprising 10% or more of chromium, by weight, and does not include 20% or more of nickel, by weight, or (ii) a mixture of the first coating material and a second coating material, wherein the first coating material comprises the chromium that oxidizes at a high temperature environment of 700° C. or more to form $Cr_2O_3$, wherein the second coating material is a material selected from the group consisting of any one of, or a mixture of, cBN, TiC, TiN, TiAlN, $TiB_2$, WC, $Cr_3C_2$, SiC, ZrC, VC, $B_4C$, $Si_3N_4$, $ZrO_2$, and $Al_2O_3$, and wherein after the pores are filled with the solid lubricating material, the high-temperature member can be disposed so that the sliding surface of the high-temperature member contacts the second member, and wherein the sliding surface contacts the second member under the high temperature environment of 700° C. or more, and the chromium of the coating layer oxidizes under the high temperature environment of 700° C. or more to substantially increase formation of $Cr_2O_3$.

4. The high-temperature member according to claim 3, wherein after the electro-discharge surface treatment is performed with the first coating material, a heating treatment is performed.

5. The high-temperature member according to claim 3, wherein the high-temperature member is a turbine rotor blade, a stator blade segment, a compressor stator blade segment, a combustor of a gas turbine, or a stationary component of a turbine or an afterburner.

6. The high-temperature member according to claim 3, wherein the solid lubricating material is $Cr_2O_3$.

7. The high-temperature member according to claim 3, wherein the solid lubricating material is a mixture of $Cr_2O_3$ and Si.

* * * * *